(12) United States Patent
Nishida

(10) Patent No.: US 7,605,573 B2
(45) Date of Patent: Oct. 20, 2009

(54) SWITCHING REGULATOR PROVIDING SLOPE COMPENSATION AND VOLTAGE CONTROL METHOD THEREOF

(75) Inventor: Junji Nishida, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 184 days.

(21) Appl. No.: 11/547,325

(22) PCT Filed: Mar. 2, 2006

(86) PCT No.: PCT/JP2006/004526

§ 371 (c)(1),
(2), (4) Date: Oct. 3, 2006

(87) PCT Pub. No.: WO2006/093335

PCT Pub. Date: Sep. 8, 2006

(65) Prior Publication Data

US 2007/0285073 A1 Dec. 13, 2007

(30) Foreign Application Priority Data

Mar. 3, 2005 (JP) ............................. 2005-059210

(51) Int. Cl.
*G05F 1/00* (2006.01)
(52) U.S. Cl. ..................................... 323/282; 363/21.01
(58) Field of Classification Search ................. 323/266, 323/282; 363/21.01, 79, 124
See application file for complete search history.

(56) References Cited

U.S. PATENT DOCUMENTS

| | | | | |
|---|---|---|---|---|
| 4,831,322 A | * | 5/1989 | Mashino et al. ................ 322/28 |
| 4,975,819 A | * | 12/1990 | Lannuzel ..................... 363/16 |
| 5,028,926 A | * | 7/1991 | Tokuhiro ..................... 341/161 |
| 5,192,906 A | * | 3/1993 | Nathan ........................ 323/284 |
| 5,554,925 A | * | 9/1996 | Shibata ....................... 323/282 |
| 5,642,035 A | * | 6/1997 | Ragsdale ..................... 323/282 |
| 5,903,447 A |  | 5/1999 | Takahashi et al. |
| 6,356,466 B1 | * | 3/2002 | Smidt et al. ............... 363/21.17 |
| 6,944,034 B1 | * | 9/2005 | Shteynberg et al. ....... 363/21.13 |
| 2004/0218319 A1 | * | 11/2004 | Sae-Ueng et al. ............ 361/18 |
| 2005/0007045 A1 | * | 1/2005 | Kinukawa et al. ........... 318/254 |
| 2005/0206359 A1 | * | 9/2005 | Daniels et al. .............. 323/282 |

FOREIGN PATENT DOCUMENTS

| | | |
|---|---|---|
| JP | 7-39346 Y2 | 9/1995 |
| JP | 11-41924 A | 2/1999 |
| JP | 2004-40856 A | 2/2004 |

* cited by examiner

*Primary Examiner*—Patrick J Assouad
*Assistant Examiner*—Arun Williams
(74) *Attorney, Agent, or Firm*—Dickstein Shapiro LLP

(57) ABSTRACT

A CMC-type switching regulator is disclosed that includes: a switching element switching to control outputting of input voltage; a smoothing circuit outputting the smoothed output voltage of the switching element to an output terminal; a voltage divider dividing the output voltage; an error amplifier amplifying the difference between reference voltage and the divided voltage; a slope voltage generator generating slope voltage according to the reference voltage, correcting the slope of the slope voltage in accordance with the input-output voltage difference, detecting current flowing through the switching element and generating voltage according to the detected current, and outputting the generated voltage and the corrected slope voltage; a pulse generator outputting a pulse signal having time width according to the output voltages of the error amplifier and the slope voltage generator; and a switching controller controlling the switching of the switching element in accordance with the output signal of the pulse generator.

13 Claims, 3 Drawing Sheets

SWITCHING REGULATOR PROVIDING SLOPE COMPENSATION AND VOLTAGE CONTROL METHOD THEREOF

TECHNICAL FIELD

The present invention relates generally to switching regulators with current-mode control, and more particularly to a switching regulator of a current-mode control type capable of high-speed response to input voltage and load fluctuation.

BACKGROUND ART

Conventionally, voltage-mode control (VMC) is commonly used in switching regulators. VMC-type switching regulators stabilize output voltage by performing PWM control on a switching device in accordance with the voltage difference between the output voltage and a reference voltage. However, the VMC-type switching regulators, which detect a feedback signal from the output voltage, are slow in responding to a change in the output voltage, thus causing a problem in that the phase compensation of an error amplifier circuit amplifying the voltage difference between the output voltage and the reference voltage is complicated.

In recent years, switching regulators of a current-mode control (CMC) type have been widely used as a technology to overcome the above-described defects. It is known, however, that if the on-duty cycle of PWM control exceeds 50%, subharmonic oscillation occurs in the CMC-type switching regulators so that the CMC-type switching regulators become uncontrollable. As a measure against this, usually, slope compensation is performed on PWM control, thereby preventing subharmonic oscillation.

FIG. 1 is a circuit diagram showing a CMC-type switching regulator 100 with a circuit performing such slope compensation (see, for example, Japanese Examined Utility Model Application Publication No. 7-39346).

Referring to FIG. 1, the switching regulator 100 includes a constant voltage control feedback loop and a constant current control feedback loop. The voltage difference between an output voltage Vo supplied to a load 105 and a reference voltage Vr is amplified in an error amplifier circuit 109. The output voltage of the error amplifier circuit 109 is input to the inverting input of a voltage comparator circuit 108 included in a peak current controller circuit 107. The output voltage of a current detector 106 is applied to the non-inverting input of the voltage comparator circuit 108. The current detector 106 includes a current transformer. The current detector 106 detects current pulses with slope flowing on the secondary side of a transformer 102, converts the current pulses into voltage, and outputs the voltage to the non-inverting input of the voltage comparator circuit 108. Reference numeral 104 denotes a rectifying and smoothing circuit.

The peak current controller circuit 107 includes the voltage comparator circuit 108, a flip-flop circuit 110, and an oscillator circuit (OSC) 112. The flip-flop circuit 110 is set by a clock signal output from the oscillator circuit 112, and is reset by the output signal of the voltage comparator circuit 108. The output Q of the flip-flop circuit 110 is connected to the input of a driver circuit 111, and controls the gate voltage of a switching device 103 through the driver circuit 111 so as to perform ON/OFF control of the switching device 103. The driver circuit 111 is formed of an emitter follower circuit of an NPN transistor 117 and a PNP transistor 118. The output of the driver circuit 111 is also connected to a slope compensator circuit 116.

The slope compensator circuit 116 includes an integrating circuit of a resistor 119 and a capacitor 120, a diode 121 for rapidly discharging the electric charge of the capacitor 120, and a resistor 122 for adding the voltage across the capacitor 120 to the output voltage of the current detector 106. If the output signal of the driver circuit 111 is HIGH (at a high level), the switching device 103 turns ON and the capacitor 120 is charged through the resistor 119 so that a slope voltage is generated. If the output signal of the driver circuit 111 is LOW (at a low level), the switching device 103 turns OFF, and the electric charge of the capacitor 120 is discharged through the diode 121 in a short period of time, thereby generating sawtooth wave voltage. The slope compensator circuit 116 performs slope compensation by adding the sawtooth wave voltage to the output voltage of the current detector 106.

However, the inclination of a compensation slope in the slope compensator circuit 116 is determined by supply voltage Vcc and the specific values of the resistor 119 and the capacitor 120. Accordingly, if the supply voltage Vcc is constant, the slope voltage to be generated is constant in level, and the inclination of its slope is reduced over time. Accordingly, since the amount of slope compensation remains unchanged even in the case of changing the output voltage Vo, the slope compensation becomes excessive or insufficient depending on the combination of the output voltage Vo and load current, so that subharmonic oscillation may be caused. Further, subharmonic oscillation occurs when the on-duty cycle of PWM control is greater than or equal to 50%. Accordingly, it is desirable that the inclination of the slope be constant or increase over time. However, according to the above-described conventional configuration, the inclination of the slope is reduced over time. Accordingly, in the case of a less than 50% on-duty cycle of PWM control, where no slope compensation is necessary, the slope compensation becomes excessive, so that the accuracy of the output voltage Vo is impaired in the area of less output current.

DISCLOSURE OF THE INVENTION

Accordingly, it is a general object of the present invention to provide a CMC-type switching regulator in which the above-described disadvantages are eliminated.

A more specific object of the present invention is to provide a CMC-type switching regulator capable of generating a slope voltage of excellent linearity and performing appropriate slope compensation also in the case of changing input voltage or output voltage.

Another more specific object of the present invention is to provide a voltage control method of such a CMC-type switching regulator.

One or more of the above objects of the present invention are achieved by a switching regulator of a current-mode control type converting an input voltage input to an input terminal into a voltage proportional to a set reference voltage and outputting the voltage from an output terminal, the switching regulator including: a switching element configured to perform switching in accordance with a control signal input to a control electrode of the switching element so as to perform output control of the input voltage; a smoothing circuit configured to smooth an output voltage of the switching element and output the smoothed output voltage to the output terminal; a voltage divider circuit configured to divide the voltage at the output terminal with a predetermined ratio; an error amplifier circuit configured to amplify a voltage difference between the reference voltage and an output divided voltage of the voltage divider circuit; a slope voltage generator circuit configured to generate a slope voltage according to the reference voltage, correct an inclination of a slope of the slope voltage in accordance with a voltage difference between the input voltage and the voltage at the output terminal, detect a current flowing through the switching element and generate a voltage according to the detected current, and add up and output the generated voltage and the corrected slope voltage; a pulse generator circuit configured to generate and output a pulse signal having time width according to an output voltage of the error amplifier circuit and the output voltage of the slope voltage generator circuit; and a switching controller circuit configured to control the switching of the switching element in accordance with the output pulse signal of the pulse generator circuit.

According to a switching regulator according to one embodiment of the present invention, a voltage according to a current flowing through a switching element is generated; a slope voltage according to a reference voltage is generated; the inclination of the slope of the slope voltage is corrected in accordance with the voltage difference between an input voltage and an output voltage; a voltage according to the current flowing through the switching element and the corrected slope voltage are added up; the voltage difference between the reference voltage and a divided voltage obtained by dividing the output voltage is amplified; a pulse having time width according to the added-up voltages and the amplified voltage is generated; and the switching of the switching element is controlled in accordance with the generated pulse. This makes it possible to generate slope voltage of excellent linearity, to perform appropriate slope compensation also in the case of changing input voltage or output voltage, and to improve the speed of response to the fluctuation of the input voltage and the output voltage.

One or more of the above objects of the present invention are also achieved by a voltage control method of a switching regulator of a current-mode control type, the switching regulator dividing a voltage output from an output terminal with a predetermined ratio, performing output control of an input voltage input to an input terminal using a switching element so that the divided voltage is equal to a set reference voltage, and smoothing a voltage output from the switching element and outputting the smoothed voltage from the output terminal, the voltage control method including the steps of: (a) amplifying a voltage difference between the reference voltage and the divided voltage; (b) generating a slope voltage according to the reference voltage and correcting an inclination of a slope of the slope voltage in accordance with a voltage difference between the input voltage and the voltage at the output terminal; (c) detecting a current flowing through the switching element and generating a voltage according to the detected current; (d) adding up the voltage generated in step (c) and the slope voltage corrected in step (b); (e) generating a pulse having time width according to a voltage obtained by step (a) and a voltage obtained by step (d); and (f) switching the switching element in accordance with the pulse generated in step (e).

According to a voltage control method of a switching regulator according to one embodiment of the present invention, a voltage according to a current flowing through a switching element is generated; a slope voltage according to a reference voltage is generated; the inclination of the slope of the slope voltage is corrected in accordance with the voltage difference between an input voltage and an output voltage; a voltage according to the current flowing through the switching element and the corrected slope voltage are added up; the voltage difference between the reference voltage and a divided voltage obtained by dividing the output voltage is amplified; a pulse having time width according to the added-up voltages and the amplified voltage is generated; and the switching of the switching element is controlled in accordance with the generated pulse. This makes it possible to generate a slope voltage of excellent linearity, to perform appropriate slope compensation also in the case of changing input voltage or output voltage, and to improve the speed of response to the fluctuation of the input voltage and the output voltage.

BRIEF DESCRIPTION OF THE DRAWINGS

Other objects, features and advantages of the present invention will become more apparent from the following detailed description when read in conjunction with the accompanying drawings, in which.

BEST MODE FOR CARRYING OUT THE INVENTION

A description is given below, with reference to the accompanying drawings, of an embodiment of the present invention.

Figure 1:
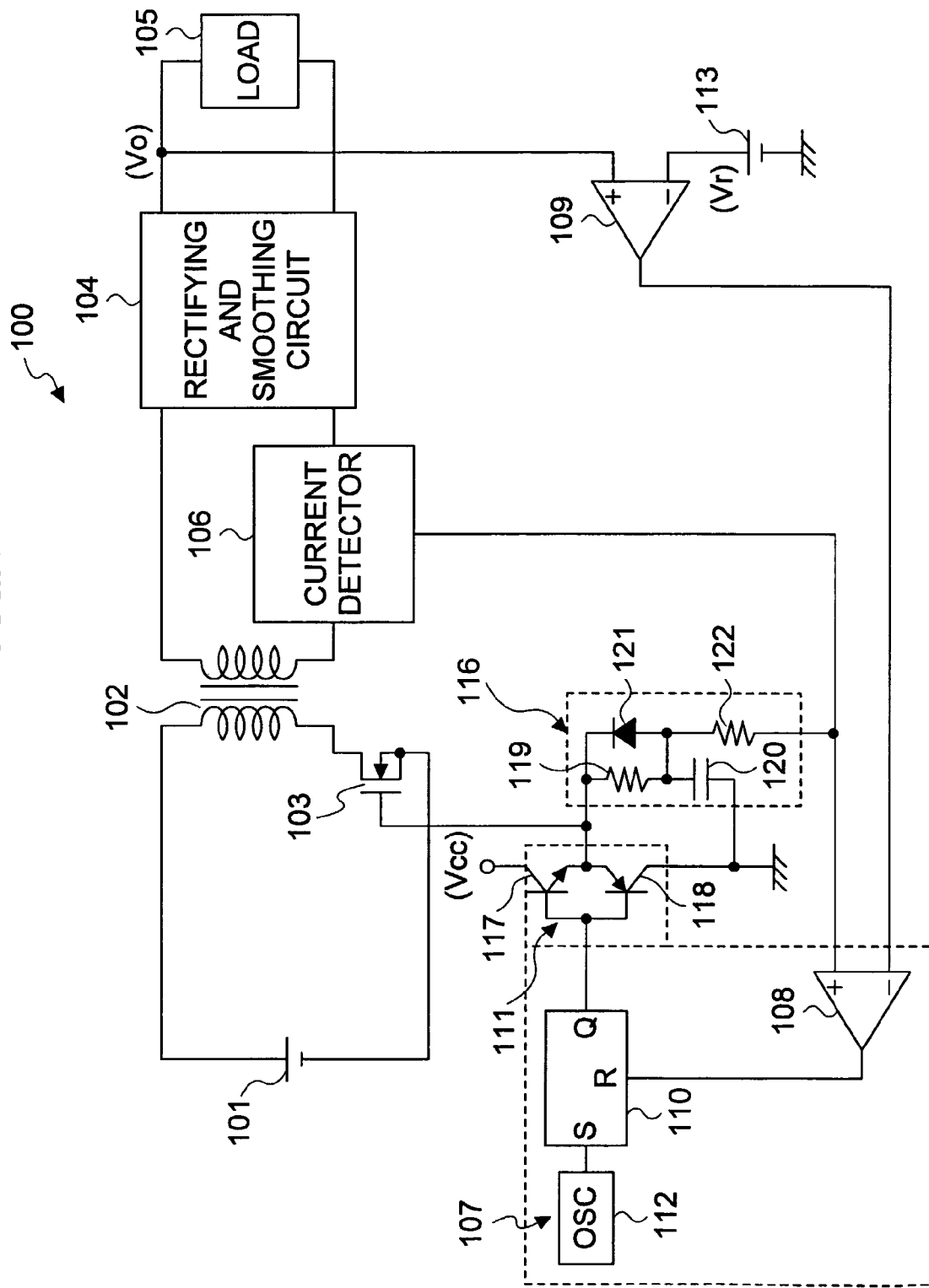
FIG. 1 is a circuit diagram showing a conventional CMC-type switching regulator.
Figure 2:
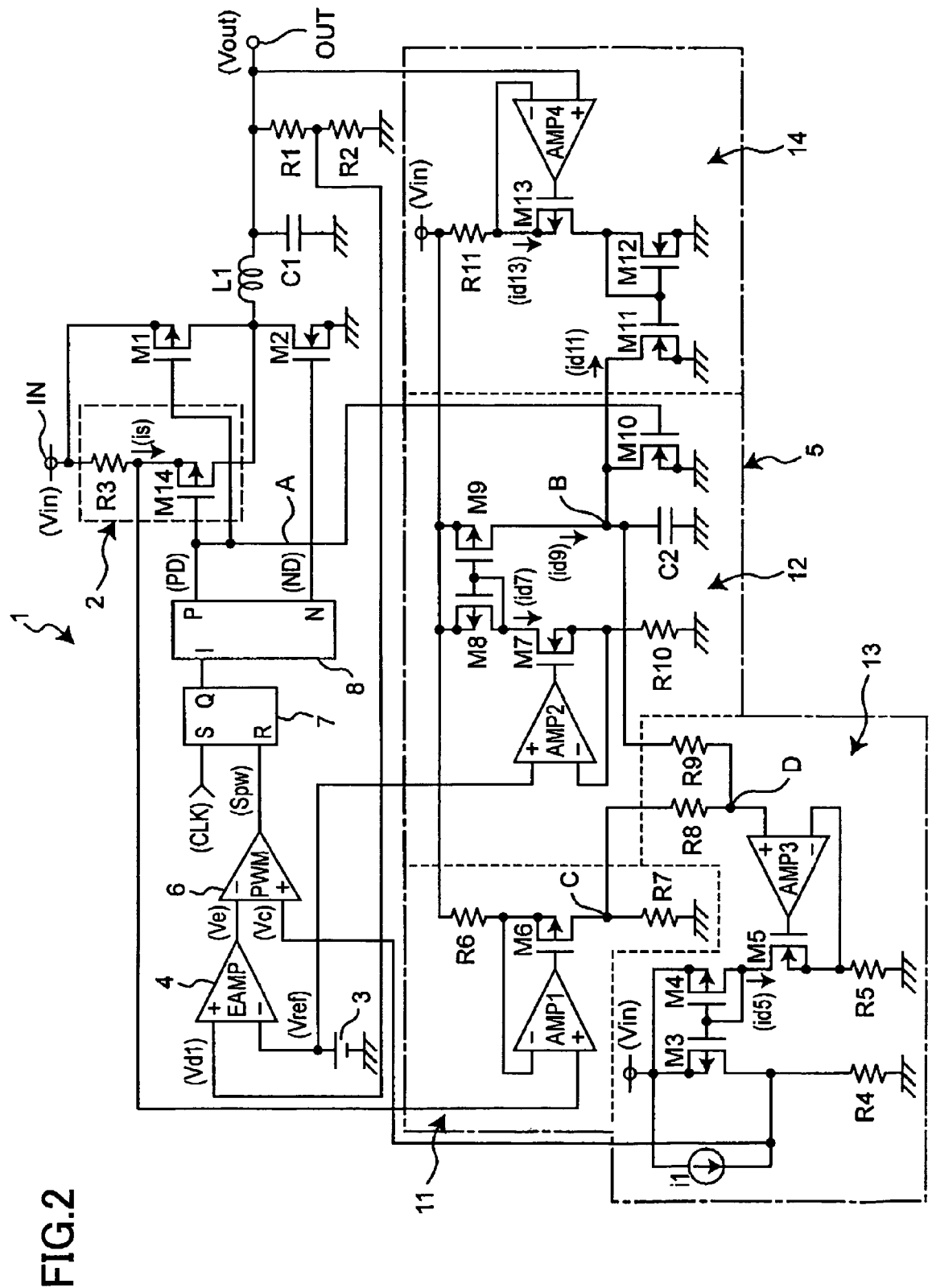
FIG. 2 is a circuit diagram showing a CMC-type switching regulator according to an embodiment of the present invention.

FIG. 2 is a circuit diagram showing a CMC (current-mode control)-type switching regulator 1 according to the embodiment of the present invention.

Referring to FIG. 2, the switching regulator 1 converts an input voltage Vin input to an input terminal IN into a predetermined voltage, and outputs the predetermined voltage from an output terminal OUT as an output voltage Vout.

The switching regulator 1 includes a switching device M1 formed of a PMOS transistor performing output control of current from the input terminal IN, a switching device M2 for synchronous rectification formed of an NMOS transistor, an inductor L1 and a capacitor C1 for smoothing, and resistors R1 and R2 for output voltage detection. The resistors R1 and R2 generate a divided voltage Vd1 by dividing the voltage Vout output from the output terminal OUT, and output the generated divided voltage.

The switching regulator 1 further includes a current detector circuit 2, a reference voltage generator circuit 3, an error amplifier circuit 4, and a slope voltage generator circuit 5. The current detector circuit 2 is formed of a series circuit of a resistor R3 and a switching device M14. The current detector circuit 2 is connected in parallel with the switching device M1, and detects current flowing through the switching device M1. The reference voltage generator circuit 3 generates and outputs a set reference voltage Vref. The error amplifier circuit 4 compares the divided voltage Vd1 and the reference voltage Vref, generates a voltage Ve by amplifying the voltage difference between the divided voltage Vd1 and the reference voltage Vref, and outputs the generated voltage Ve. The slope voltage generator circuit 5 generates a slope voltage Vc according to the reference voltage Vref.

The switching regulator 1 further includes a PWM comparator circuit 6, a flip-flop circuit 7, and a driver circuit 8. The PWM comparator circuit 6 compares the output voltage Ve of the error amplifier circuit 4 and the slope voltage Vc, and generates and outputs a pulse signal Spw for performing PWM control, the pulse signal Spw having pulse width corresponding to the output voltage Ve. A predetermined clock signal CLK and the pulse signal Spw from the PWM comparator circuit 6 are input to the set input S and the reset input R, respectively, of the flip-flop circuit 7. In accordance with the output signal of the flip-flop circuit 7, the driver circuit 8 drives the switching device M1 by generating a control signal PD for controlling switching of the switching device M1, and also drives the switching device M2 for synchronous rectification by generating a control signal ND for controlling switching of the switching device M2.

The switching device M1 forms a switching element. The switching device M2, the inductor L1, and the capacitor C1 form a smoothing circuit. The current detector circuit 2 forms a current detector circuit part. The resistors R1 and R2 form a voltage divider circuit. The PWM comparator circuit 6 forms a pulse generator circuit. The flip-flop circuit 7 and the driver circuit 8 form a switching controller circuit.

The switching devices M1 and M2 are connected in series between the input terminal IN and ground. The inductor L1 is connected between the drain of the switching device M1 and the output terminal OUT. The capacitor C1 and a series circuit of the resistors R1 and R2 are connected in parallel between ground and the output terminal OUT. The divided voltage Vd1, which is a voltage at the connection of the resistors R1 and R2, is input to the non-inverting input of the error amplifier circuit 4. The reference voltage Vref is input to the inverting input of the error amplifier circuit 4. The output voltage Ve of the error amplifier circuit 4 is input to the inverting input of the PWM comparator circuit 6. The slope voltage Vc is input to the non-inverting output of the PWM comparator circuit 6. The output signal of the flip-flop circuit 7 is input to the driver circuit 8. The driver circuit 8 outputs the control signal PD to the gate of the switching device M1 and outputs the control signal ND to the gate of the switching device M2 for synchronous rectification.

On the other hand, the current detector circuit 2 is formed of a series circuit of the resistor R3 and the switching device M14, and the series circuit is connected in parallel with the switching device M1. The control signal PD from the driver circuit 8 is input to the gate of the switching device M14. The voltage at the connection of the resistor R3 and the switching device M14 is output to the slope voltage generator circuit 5. The switching device M14 is formed of the same type of MOS transistor as the switching device M1. The control signal PD from the driver circuit 8 causes the switching device M14 to turn ON and OFF in synchronization with the switching device M1.

A detection current is flowing through the current detector circuit 2 is as follows. For example, letting the ON-resistance of the switching device M1, the ON-resistance of the switching device M14, and the resistance of the resistor R3 be 0.1 Ω, 5 Ω, and 5 Ω, respectively, and letting a current output from the output terminal OUT when the switching devices M1 and M14 are ON be io, the detection current is is given by:

$$is = io \times 0.1/(0.1+5+5) \approx io/100. \tag{1}$$

Eq. (1) shows that the detection current is is proportional to the output current io. The output current io can be determined by measuring the voltage drop across the resistor R3 due to the detection current is. However, currents flowing through the resistors R1 and R2 and the capacitor C1 and a current flowing through an operational amplifier circuit AMP4 described below are so small as to be negligible.

The slope voltage generator circuit 5 includes a voltage generator circuit part 11, a slope voltage generator circuit part 12, a voltage adder circuit part 13, and a slope corrector circuit part 14. The voltage generator circuit part 11 amplifies a current value detected in the current detector circuit 2 by a predetermined magnification. The slope voltage generator circuit part 12 generates a slope voltage according to the reference voltage Vref. The voltage adder circuit part 13 adds up the output voltages of the voltage generator circuit part 11 and the slope voltage generator circuit part 12, and outputs the added-up output voltages as the slope voltage Vc. The slope corrector circuit part 14 corrects the slope of the slope voltage generated in the slope voltage generator circuit part 12 in accordance with the voltage difference between the input voltage Vin and the output voltage Vout.

The voltage generator circuit part 11 includes an operational amplifier AMP1, a PMOS transistor M6, and resistors R6 and R7. The non-inverting input of the operational amplifier circuit AMP1 is connected to the connection of the resistor R3 and the source of the switching device M14 which connection is the output of the current detector circuit 2. The resistor R6, the PMOS transistor M6, and the resistor R7 are connected in series between the input terminal IN and ground. The inverting input of the operational amplifier circuit AMP1 is connected to the source of the PMOS transistor M6. The output of the operational amplifier AMP1 is connected to the gate of the PMOS transistor M6. As a result, the voltage across the resistor R7 is proportional to the detection current is, that is, proportional to the output current io.

The slope voltage generator circuit part 12 includes an operational amplifier circuit AMP2, NMOS transistors M7 and M10, PMOS transistors M8 and M9 forming a current mirror circuit, a resistor R10, and a capacitor C2. The reference voltage Vref is input to the non-inverting input of the operational amplifier circuit AMP2. The inverting input of the operational amplifier circuit AMP2 is connected to the source of the NMOS transistor M7. The output of the operational amplifier circuit AMP2 is connected to the gate of the NMOS transistor M7. The source of the NMOS transistor M7 is grounded through the resistor R10. The drain of the NMOS transistor M7 is connected to the drain of the PMOS transistor M8.

The input voltage Vin is input to the source of each of the PMOS transistors M8 and M9. The gates of the PMOS transistors MB and M9 are connected to each other, and the connection of the gates is connected to the drain of the PMOS transistor M8. The drain of the PMOS transistor M9 is grounded through the capacitor C2. The drain of the NMOS transistor M10 is connected to the connection of the capacitor C2 and the drain of the PMOS transistor M9. The source of the NMOS transistor M10 is grounded, and the control signal PD from the driver circuit 8 is input to the gate of the NMOS transistor M10.

The voltage adder circuit part 13 includes an operational amplifier circuit AMP3, PMOS transistors M3 and M4 forming a current mirror circuit, an NMOS transistor M5, a current source i1, and resistors R4, R5, R8, and R9. The non-inverting input of the operational amplifier circuit AMP3 is connected through the resistor R8 to the drain of the PMOS transistor M6, which drain is the output of the voltage generator circuit part 11. The non-inverting input of the operational amplifier circuit AMP3 is also connected through the resistor R9 to the drain of the PMOS transistor M9, which drain is the output of the slope voltage generator circuit part 12. Further, the inverting input of the operational amplifier AMP3 is connected to the source of the NMOS transistor M5, and the output of the operational amplifier circuit AMP3 is connected to the gate of the NMOS transistor M5.

The source of the NMOS transistor M5 is grounded through the resistor R5. The drain of the NMOS transistor M5 is connected to the drain of the PMOS transistor M4. The gates of the PMOS transistors M3 and M4 are connected to each other, and the connection of the gates is connected to the drain of the PMOS transistor M4. The input voltage Vin is input to the source of each of the PMOS transistors M3 and M4. The drain of the PMOS transistor M3 is grounded through the resistor R4. The current source i1 is connected in parallel with the PMOS transistor M3. The current source i1 supplies a predetermined current to the resistor R4, thereby generating offset voltage.

The slope corrector circuit part 14 includes the operational amplifier AMP4, NMOS transistors M11 and M12 forming a current mirror circuit, a PMOS transistor M13, and a resistor R11. The output voltage Vout is input to the non-inverting input of the operational amplifier AMP4. The inverting input of the operational amplifier AMP 4 is connected to the source of the PMOS transistor M13. The input voltage Vin is input to the source of the PMOS transistor M13 through the resistor R11. The drain of the PMOS transistor M13 is connected to the drain of the NMOS transistor M12. The gates of the NMOS transistors M11 and M12 are connected to each other, and the connection of the gates is connected to the drain of the NMOS transistor M12. The drain of the NMOS transistor M11 is connected to the connection of the capacitor C2 and the drain of the PMOS transistor M9. The source of each of the NMOS transistors M11 and M12 is grounded.

Figure 3:
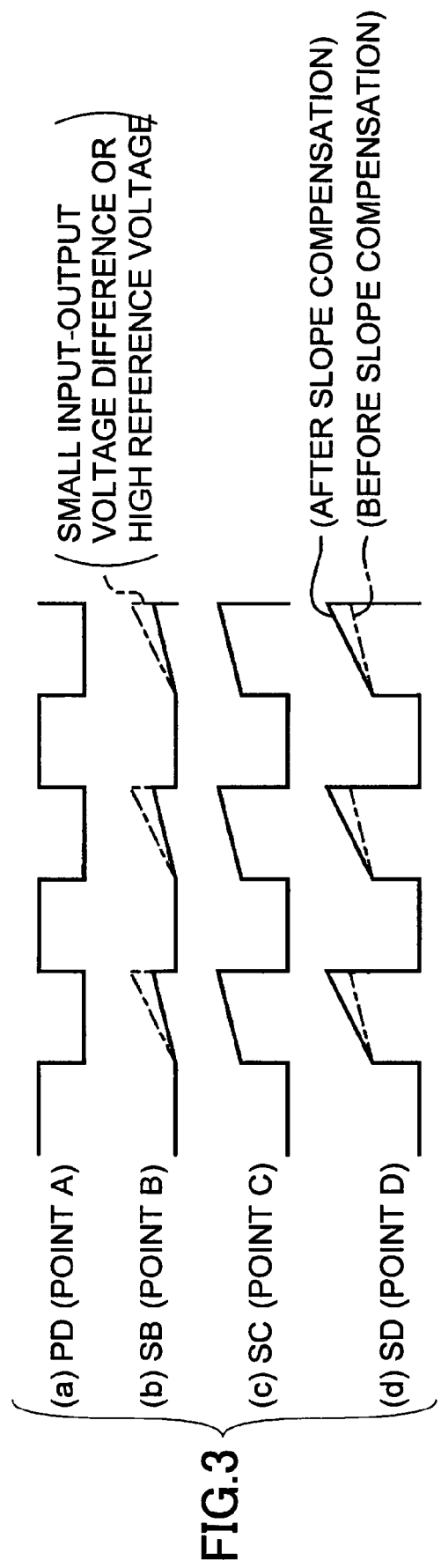
FIG. 3 is a timing chart showing waveforms at Points A through D (FIG. 2) in the switching regulator according to the embodiment of the present invention.

FIG. 3 is a timing chart showing waveforms at Points A through D (FIG. 2) in the switching regulator 1 configured as described above. A description is given, with reference to FIG. 3, of an operation of the slope voltage generator circuit 5.

The clock pulse signal CLK is input to the set input S of the flip-flop circuit 7. The flip-flop circuit 7 is set at the rise or fall of the clock pulse signal CLK, causing the output Q to be HIGH. The output of the PWM comparator circuit 6 is connected to the reset input R of the flip-flop circuit 7. After the flip-flop circuit 7 is set, the flip-flop circuit 7 is reset by the output signal Spw of the PWM comparator circuit 6, returning the output Q to LOW. The output Q of the flip-flop circuit 7 is connected to the input I of the driver circuit 8. The driver circuit 8 generates and outputs the control signal PD, which is a pulse signal according to the level of the signal input from the flip-flop circuit 7, and also generates and outputs the control signal ND, which is a pulse signal having the inverted signal level of the control signal PD.

When the control signal PD from the driver circuit 8 is LOW, both switching devices M1 and M14 turn ON. As a result, the detection current is flows through the resistor R3 to cause voltage drop, and the voltage is input to the voltage generator circuit part 11. The voltage generator circuit part 11 converts the voltage across the resistor R3 into a voltage with reference to ground, amplifies the voltage by a predetermined magnification m, and outputs the amplified voltage. The magnification m is determined by the resistances of the resistors R6 and R7. Letting the resistances of the resistors R6 and R7 be r6 and r7, respectively, m is given by m=r7/r6. According to this embodiment, r6 equals r7, and the magnification m is one. In FIG. 3, the output signal of the voltage generator circuit part 11, which is a signal at Point C, is shown in (c) as a signal SC.

In the slope voltage generator circuit part 12, the operational amplifier circuit AMP2 controls the gate voltage of the NMOS transistor M7 so that the voltage drop across the resistor R10 connected between the source of the NMOS transistor M7 and ground is equal to the reference voltage Vref. Therefore, letting the resistance of the resistor R10 be r10, the drain current id7 of the NMOS transistor M7 is expressed as Vref/r10, and has a current value proportional to the reference voltage Vref. This current is reflected by the current mirror circuit formed by the PMOS transistors M8 and M9 so as to charge the capacitor C2.

The NMOS transistor M10, whose gate is connected to the gate of the switching device M1, is connected in parallel with the capacitor C2. Therefore, during the OFF period of the switching device M1, the NMOS transistor M10 is ON so as to bypass the current to charge the capacitor C2. Accordingly, the voltage of the capacitor C2 is prevented from rising. When the switching device M1 turns ON, the NMOS transistor M10 turns OFF, so that the capacitor C2 is charged with the current reflected by the current mirror circuit formed by the PMOS transistors M8 and M9. As a result, the voltage of a signal SB at Point B in FIG. 2 rises over time as shown in (b) of FIG. 3. The angle of the slope of the voltage rise is constant, and is proportional to the reference voltage Vref. If the reference voltage Vref is high, the angle of the slope of the signal SB increases as indicated by the dot-dash line.

The output signal SC of the voltage generator circuit part 11 and the output signal SB of the slope voltage generator circuit part 12 are input to the non-inverting input of the operational amplifier circuit AMP3 of the voltage adder circuit part 13 through the corresponding resistors R8 and R9. The waveform of a signal SD input to the non-inverting input of the operational amplifier circuit AMP3 is shown by the solid line in (d) of FIG. 3. The waveform indicated by the dot-dash line in (d) of FIG. 3 shows the case where the output signal SB from the slope voltage generator circuit part 12 is not input. The voltage at Point D of FIG. 2 is the sum of the voltages of the output signal SC of the voltage generator circuit part 11 and the output signal SD of the slope voltage generator circuit part 12. The operational amplifier circuit AMP 3 controls the gate voltage of the NMOS transistor M5 so that the voltage across the resistor R5 is equal to the voltage at Point D. Accordingly, the drain current id5 of the NMOS transistor M5 is proportional to the voltage at Point D.

The drain current id5 is supplied to the resistor R4 through the current mirror circuit formed by the PMOS transistors M3 and M4, so that the voltage generated across the resistor R4 is also proportional to the voltage at Point D. According to this embodiment, the current ratio of the current mirror circuit formed by the PMOS transistors M3 and M4 is 1:1, and the resistors R4 and R5 are equal in resistance. Accordingly, the voltage across the resistor R4 is equal to the voltage at Point D, and is input to the non-inverting input of the PWM comparator circuit 6.

The output voltage Ve of the error amplifier circuit 4 is input to the inverting input of the PWM comparator circuit 6. The error amplifier circuit 4 amplifies the voltage difference between the reference voltage Vref and the divided voltage Vd1. If the slope voltage Vc from the voltage adder circuit part 13 exceeds the output voltage Ve of the error amplifier circuit 4, the PWM comparator circuit 6 outputs a reset pulse to the reset input R of the flip-flop circuit 7.

Thus, the switching device M1 turned ON by the clock pulse signal CLK is turned OFF by the output signal Spw of the PWM comparator circuit 6. By repeating this operation, the output voltage Vout is controlled so as to be constant.

On the other hand, when a predetermined current is supplied from the current source i1 provided in the voltage adder circuit part 13 to the resistor R4, an offset voltage is applied to the signal SD, so that the voltage waveform of the signal SD rises by the offset voltage. Thus, by applying offset voltage to the signal SD, it is possible to stabilize the operation of the PWM comparator circuit 6. Further, since the error amplifier circuit 4 has a frequency advance component, error corresponding to this advance component is caused in the output voltage Ve. Correction by application of offset voltage corresponding to the output deviation makes it possible to improve the accuracy of the output voltage Vout.

The slope voltage generator circuit part 12 generates a slope voltage based on the reference voltage Vref. Accordingly, in the case of changing the output voltage Vout, the reference voltage Vref is changed. Changing the reference voltage Vref makes it possible to change not only the output voltage Vout but also the slope of the slope voltage. Therefore, there is no need to change the circuit constants of the slope voltage generator circuit part 12 with a change in the output voltage Vout, thus making it possible to change the output voltage Vout with ease.

Next, a description is given of the slope corrector circuit part 14.

In the slope corrector circuit part 14, the operational amplifier AMP4 controls the gate voltage of the PMOS transistor M13 so that the source voltage of the PMOS transistor M13 is equal to the output voltage Vout. The input voltage Vin is applied to the source of the PMOS transistor M13 through the resistor R11. Accordingly, the difference in voltage between the input voltage Vin and the output voltage Vout is applied to the resistor R11. As a result, the drain current id13 of the PMOS transistor M13 is proportional to the voltage difference between the input voltage Vin and the output voltage Vout.

The drain current id13 is reflected by the current mirror circuit formed by the NMOS transistors M11 and M12. The drain of the NMOS transistor M11 is connected to the drain of the PMOS transistor M9. Accordingly, the drain current id11 of the NMOS transistor M11 is the bypassed drain current id9 of the PMOS transistor M9, that is, the bypassed current to charge the capacitor C2. As described above, the drain current id11 of the NMOS transistor M11 changes in accordance with the voltage difference between the input voltage Vin and the output voltage Vout. Accordingly, the current to charge the capacitor C2 changes in accordance with the voltage difference between the input voltage Vin and the output voltage Vout.

If the voltage difference between the input voltage Vin and the output voltage Vout is small, the drain current id11 of the NMOS transistor M11 is small. Accordingly, the waveform of the signal SB of (b) of FIG. 3 rises as indicated by the dot-dash line. By such slope correction, the fluctuation of the input voltage Vin and the output voltage Vout is immediately reflected in the waveform of the signal SB. Accordingly, it is possible to significantly improve the response characteristic with respect to a change in the input voltage Vin. Further, also in the case of increasing the reference voltage Vref, the waveform of the signal SB of (b) of FIG. 3 rises as indicated by the dot-dash line.

In FIG. 2, the circuits other than the inductor L1 and the capacitor C1 may be integrated into a single IC. Further, the switching device M2 for synchronous rectification may be replaced by a flywheel diode. In this case, the flywheel diode may be integrated with the circuits other than the inductor L1 and the capacitor C1 into a single IC depending on its integratability.

Thus, according to the switching regulator of this embodiment, a voltage according to a current flowing through the switching device M1 is generated; the signal SB having a slope according to the reference voltage Vref is generated; the inclination of the slope of the signal SB is corrected in accordance with the voltage difference between the input voltage Vin and the output voltage Vout; the signal SC of a voltage according to the current flowing through the switching device M1 and the signal SB having the corrected slope are added up; the voltage difference between the reference voltage Vref and the divided voltage Vd1 obtained by dividing the output voltage Vout is amplified; a pulse having time width according to the added-up voltages and the amplified voltage is generated; and the switching of the switching device M1 is controlled in accordance with the generated pulse. This makes it possible to generate a slope voltage of excellent linearity and to perform appropriate slope compensation also in the case of changing input voltage or output voltage.

According to a switching regulator according to one embodiment of the present invention, a voltage according to a current flowing through a first switching element is generated; a slope voltage according to a reference voltage is generated; the inclination of the slope of the slope voltage is corrected in accordance with the voltage difference between an input voltage and an output voltage; a voltage according to the current flowing through the first switching element and the corrected slope voltage are added up; the voltage difference between the reference voltage and a divided voltage obtained by dividing the output voltage is amplified; a pulse having time width according to the added-up voltages and the amplified voltage is generated; and the switching of the first switching element is controlled in accordance with the generated pulse. This makes it possible to generate slope voltage of excellent linearity, to perform appropriate slope compensation also in the case of changing input voltage or output voltage, and to improve the speed of response to the fluctuation of the input voltage and the output voltage.

In addition, an offset voltage may be provided to the output voltage of a voltage adder circuit part. This makes it possible to stabilize the operation of a pulse generator circuit, and correct the steady-state deviation error of the pulse generator circuit with the amount of the offset voltage.

In addition, a current detector circuit part may include a series circuit of a resistor and a second switching element, the series circuit being connected in parallel with the first switching element and the second switching element having a control electrode thereof connected to the control electrode of the first switching element. The current detector circuit part detects the current flowing through the first switching element from the voltage drop across the resistor. Accordingly, compared with the case of connecting a resistor for current detection to the first switching element in series, it is possible to reduce loss and improve power supply efficiency.

In addition, a slope voltage generator circuit part may include a first voltage-to-current converter circuit to generate a current proportional to the reference voltage, and a first capacitor charged with the output current of the first voltage-to-current converter circuit, and the voltage with which the first capacitor is charged may be output as the slope voltage. Accordingly, it is possible to generate a slope voltage with excellent linearity.

In addition, the slope voltage generator circuit part may include a third switching element connected in parallel with the first capacitor. The third switching element may perform a switching operation opposite to that of the first switching element, and release an electric charge stored in the first capacitor during a period for which the first switching element is turned OFF. Accordingly, it is possible to release the electric charge of the first capacitor until substantially no electric charge is stored therein.

In addition, a slope corrector circuit part may include a second voltage-to-current converter circuit to convert the voltage difference between the input voltage and the voltage at the output terminal into current. The second voltage-to-current converter circuit may correct the slope voltage by releasing an electric charge from the first capacitor during a period for which the first capacitor is charged with the first voltage-to-current converter circuit. Accordingly, it is possible to correct the slope voltage without impairing the linearity of the slope of the slope voltage, and to improve the speed of response to the fluctuation of the input voltage.

In addition, the voltage output from the output terminal may be changed by changing the setting of the reference voltage, so that the slope of the slope voltage may also change in accordance with a change in the output voltage. Accordingly, it is always possible to perform optimal slope compensation.

Further, according to a voltage control method of a switching regulator according to one embodiment of the present invention, a voltage according to a current flowing through a switching element is generated; a slope voltage according to a reference voltage is generated; the inclination of the slope of the slope voltage is corrected in accordance with the voltage difference between an input voltage and an output voltage; a voltage according to the current flowing through the switching element and the corrected slope voltage are added up; the voltage difference between the reference voltage and a divided voltage obtained by dividing the output voltage is amplified; a pulse having time width according to the added-up voltages and the amplified voltage is generated; and the switching of the switching element is controlled in accordance with the generated pulse. This makes it possible to generate a slope voltage of excellent linearity, to perform appropriate slope compensation also in the case of changing input voltage or output voltage, and to improve the speed of response to the fluctuation of the input voltage and the output voltage.

The present invention is not limited to the specifically disclosed embodiment, and variations and modifications may be made without departing from the scope of the present invention.

The present application is based on Japanese Priority Patent Application No. 2005-059210, filed on Mar. 3, 2005, the entire contents of which are hereby incorporated by reference.

The invention claimed is:

1. A switching regulator of a current-mode control type converting an input voltage input to an input terminal into a voltage proportional to a set reference voltage and outputting the voltage from an output terminal, the switching regulator comprising:
    a switching element configured to perform switching in accordance with a control signal input to a control electrode of the switching element so as to perform output control of the input voltage;
    a smoothing circuit configured to smooth an output voltage of the switching element and output the smoothed output voltage to the output terminal;
    a voltage divider circuit configured to divide the voltage at the output terminal with a predetermined ratio;
    an error amplifier circuit configured to amplify a voltage difference between the reference voltage and an output divided voltage of the voltage divider circuit;
    a slope voltage generator circuit configured to generate a slope voltage according to the reference voltage, correct an inclination of a slope of the slope voltage in accordance with a voltage difference between the input voltage and the voltage at the output terminal, detect a current flowing through the switching element and generate a voltage according to the detected current, and add up and output the generated voltage and the corrected slope voltage;
    a pulse generator circuit configured to generate and output a pulse signal having time width according to an output voltage of the error amplifier circuit and the output voltage of the slope voltage generator circuit; and
    a switching controller circuit configured to control the switching of the switching element in accordance with the output pulse signal of the pulse generator circuit.

2. The switching regulator as claimed in claim 1, wherein the slope voltage generator circuit reduces the inclination of the slope of the slope voltage as the voltage difference between the input voltage and the voltage at the output terminal increases.

3. The switching regulator as claimed in claim 1, wherein:
    the slope voltage generator circuit comprises:
        a current detector circuit part configured to detect the current flowing through the switching element;
        a voltage generator circuit part configured to generate the voltage according to the current detected in the current detector circuit part;
        a slope voltage generator circuit configured to generate the slope voltage according to the reference voltage;
        a slope corrector circuit part configured to correct the inclination of the slope of the slope voltage so that the inclination of the slope of the slope voltage is reduced as the voltage difference between the input voltage and the voltage at the output terminal increases; and
        a voltage adder circuit part configured to add up and output an output voltage of the voltage generator circuit part and an output voltage of the slope voltage generator circuit part; and
    the pulse generator circuit generates and outputs the pulse signal having the time width according to the output voltage of the error amplifier circuit and the output voltage of the voltage adder circuit part.

4. The switching regulator as claimed in claim 3, wherein the voltage adder circuit part outputs the added up output voltages of the voltage generator circuit part and the slope voltage generator circuit part with an offset being provided to the added up output voltages.

5. The switching regulator as claimed in claim 3, wherein:
    the current detector circuit part comprises a series circuit of a resistor and an additional switching element, the series circuit being connected in parallel with the switching element, the additional switching element having a control electrode thereof connected to the control electrode of the switching element; and
    the current detector circuit detects the current flowing through the switching element from a voltage drop across the resistor.

6. The switching regulator as claimed in claim 3, wherein:
    the slope voltage generator circuit part comprises: a voltage-to-current converter circuit configured to generate a current proportional to the reference voltage; and a capacitor configured to be charged with an output current of the voltage-to-current converter circuit; and
    the slope voltage generator circuit part outputs a voltage with which the capacitor is charged as the slope voltage.

7. The switching regulator as claimed in claim 6, wherein the slope voltage generator circuit part comprises an additional switching element connected in parallel with the capacitor, the additional switching element performing switching opposite to the switching of the switching element so that the additional switching element releases an electric charge stored in the capacitor during a period for which the switching element is turned off.

8. The switching regulator as claimed in claim 6, wherein:
    the slope corrector circuit part comprises an additional voltage-to-current converter circuit configured to convert the voltage difference between the input voltage and the voltage at the output terminal into a current; and the additional voltage-to-current converter circuit corrects the slope voltage by releasing an electric charge from the capacitor during a period for which the capacitor is charged by the voltage-to-current converter circuit.

9. The switching regulator as claimed in claim 1, further comprising:

a reference voltage generator circuit configured to generate the set reference voltage, wherein the voltage output from the output terminal is changed by changing a setting of the reference voltage of the reference voltage generator circuit.

10. The switching regulator as claimed in claim 1, wherein the switching element, the voltage divider circuit, the error amplifier circuit, the slope voltage generator circuit, the pulse generator circuit, and the switching controller circuit are integrated into a single IC.

11. The switching regulator as claimed in claim 1, wherein:

the smoothing circuit comprises:

an inductor connected between an output of the switching element and the output terminal;

an additional switching element for synchronous rectification, the additional switching element being configured to release energy stored in the inductor in accordance with a control signal input to a control electrode of the additional switching element; and a capacitor for smoothing connected to the output terminal; and the switching element, the additional switching element, the voltage divider circuit, the error amplifier circuit, the slope voltage generator circuit, the pulse generator circuit, and the switching controller circuit are integrated into a single IC.

12. A voltage control method of a switching regulator of a current-mode control type, the switching regulator dividing a voltage output from an output terminal with a predetermined ratio, performing output control of an input voltage input to an input terminal using a switching element so that the divided voltage is equal to a set reference voltage, and smoothing a voltage output from the switching element and outputting the smoothed voltage from the output terminal, the voltage control method comprising the steps of:

(a) amplifying a voltage difference between the reference voltage and the divided voltage;

(b) generating a slope voltage according to the reference voltage and correcting an inclination of a slope of the slope voltage in accordance with a voltage difference between the input voltage and the voltage at the output terminal;

(c) detecting a current flowing through the switching element and generating a voltage according to the detected current;

(d) adding up the voltage generated in said step (c) and the slope voltage corrected in said step (b);

(e) generating a pulse having time width according to a voltage obtained by said step (a) and a voltage obtained by said step (d); and (f) switching the switching element in accordance with the pulse generated in said step (e).

13. The voltage control method as claimed in claim 12, wherein said step (b) reduces the inclination of the slope of the slope voltage as the voltage difference between the input voltage and the voltage at the output terminal increases.

* * * * *

UNITED STATES PATENT AND TRADEMARK OFFICE
CERTIFICATE OF CORRECTION

PATENT NO. : 7,605,573 B2
APPLICATION NO. : 11/547325
DATED : October 20, 2009
INVENTOR(S) : Junji Nishida It is certified that error appears in the above-identified patent and that said Letters Patent is hereby corrected as shown below:

On title page Item (86) PCT No., change "PCT/JP2006/004526" to --PCT/JP2006/304526--.

Signed and Sealed this

Twenty-ninth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,605,573 B2
APPLICATION NO. : 11/547325
DATED : October 20, 2009
INVENTOR(S) : Junji Nishida It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 201 days.

Signed and Sealed this

Fifth Day of October, 2010

David J. Kappos
*Director of the United States Patent and Trademark Office*